(12) United States Patent
Solanki et al.

(10) Patent No.: US 9,011,089 B2
(45) Date of Patent: Apr. 21, 2015

(54) EXPANSION SEAL (75) Inventors: Shankar Pandurangasa Solanki, Bangaglore (IN); Mohan Rao Javvadi, Bangalore (IN); Lionel Toussaint, Gerardmer (FR); Emmanuel Severin, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 526 days.

(21) Appl. No.: 13/469,268

(22) Filed: May 11, 2012

(65) Prior Publication Data
US 2013/0302148 A1    Nov. 14, 2013

(51) Int. Cl.
| F01D 25/24 | (2006.01) |
| F01D 11/00 | (2006.01) |
| F01D 17/16 | (2006.01) |
| F02C 6/12 | (2006.01) |
| F02C 7/28 | (2006.01) |
| F16J 15/08 | (2006.01) |
| F16J 15/16 | (2006.01) |

(52) U.S. Cl.
CPC ............ *F01D 11/003* (2013.01); *F01D 11/005* (2013.01); *F01D 17/165* (2013.01); *F01D 25/24* (2013.01); *F02C 6/12* (2013.01); *F02C 7/28* (2013.01); *F05D 2220/40* (2013.01); *F05D 2240/55* (2013.01); *F16J 15/0887* (2013.01); *F16J 15/164* (2013.01)

(58) Field of Classification Search
CPC ...................................................... F01D 25/24
USPC ................ 415/173.1, 206; 417/405, 406, 407
See application file for complete search history.

(56) References Cited

U.S. PATENT DOCUMENTS

| 5,145,334 | A  * | 9/1992 | Gutknecht .................... 417/407 |
| 7,351,042 | B2 | 4/2008 | Jinnai et al. |
| 7,559,199 | B2 | 7/2009 | Sausse et al. |
| 2008/0075582 | A1* | 3/2008 | Sausse et al. ................. 415/159 |
| 2008/0260520 | A1* | 10/2008 | Hettinger et al. ............. 415/163 |
| 2009/0092483 | A1* | 4/2009 | Yasui et al. ................... 415/159 |
| 2012/0263585 | A1 | 10/2012 | Matsuyama |
| 2013/0084161 | A1 | 4/2013 | Groves et al. |

FOREIGN PATENT DOCUMENTS

| DE | 102004039473 | A1 | 3/2006 |
| EP | 1691034 | A2 | 8/2006 |
| EP | 2180160 | A1 | 4/2010 |
| EP | 2243939 | A1 | 10/2010 |
| JP | 2011157841 | A | 8/2011 |
| WO | 2004022926 | A1 | 3/2004 |
| WO | 2004027218 | A1 | 4/2004 |
| WO | 2004109063 | A1 | 12/2004 |
| WO | 2013042554 | A1 | 3/2013 |

OTHER PUBLICATIONS

European Search Report, EP 14 15 3894, May 27, 2014 (4 pages).

* cited by examiner

*Primary Examiner* — Ninh H Nguyen
(74) *Attorney, Agent, or Firm* — Brian J. Pangrle (57) ABSTRACT

A turbine assembly can include a turbine wheel, a shroud component, a turbine housing, and an expansion seal that includes a lower lip, an upper lip, and a wall that extends between the lower lip and the upper lip and that is disposed between an outer seal surface of the shroud component and an inner seal surface of the turbine housing. Various other examples of devices, assemblies, systems, methods, etc., are also disclosed.

20 Claims, 9 Drawing Sheets

EXPANSION SEAL

TECHNICAL FIELD

Subject matter disclosed herein relates generally to exhaust turbines for internal combustion engines.

BACKGROUND

An exhaust system of an internal combustion engine can include a turbine wheel set in a turbine housing to create backpressure. In such a system, as the pressurized exhaust passes through the turbine housing (e.g., en route to an atmospheric outlet), the turbine wheel harnesses energy as the exhaust expands.

Various parameters may characterize a turbine wheel or a turbine housing. For example, a parameter known as "A/R" (e.g., area divided by radius) describes a geometric characteristic of a turbine housing where a smaller NR may increase velocity of exhaust directed to a turbine wheel and provide for increased power of a turbocharger at lower engine speeds (e.g., resulting in a quicker boost rise from a compressor). However, a small A/R may also cause exhaust flow in a more tangential direction, which can reduce flow capacity of a turbine wheel and, correspondingly, tend to increase backpressure. An increase in backpressure can reduce an engine's ability to "breathe" effectively at high engine speeds, which may adversely affect peak engine power. Conversely, use of a larger A/R may lower exhaust velocity. For a turbocharger, lower exhaust velocity may delay boost rise from a compressor. For a larger NR turbine housing, flow may be directed toward a turbine wheel in a more radial fashion, which can increase effective flow capacity of the turbine wheel and, correspondingly, result in lower backpressure. A decrease in backpressure can allow for increased engine power at higher engine speeds.

As a turbine housing and turbine wheel can create backpressure in an exhaust system, opportunities exist for exhaust leakage. For example, during operation of a turbine, a turbine housing space is at a higher pressure than its environment. Also, since exhaust gas expands across a turbine wheel, pressure downstream of the turbine wheel is considerably lower than that of a turbine housing volute region. Hence, in the foregoing example, two possible regions exist for exhaust leakage.

Exhaust leakage may be of a type that leaks out of an exhaust system to the environment or of a type that remains within an exhaust system yet bypasses a turbine wheel space. As to the latter, such leakage may occur between components of an exhaust turbine, for example, where the components may expand, contract, experience force, etc., as operational conditions vary. Further, where cycling occurs (e.g., as in vehicles), components may wear, become misaligned, etc., as cycle number increases. Whether external or internal, leakage can alter performance of a turbine wheel and turbine housing assembly. For example, a leaky turbine housing may not perform according to its specified A/R, which can complicate engine control, control of a variable geometry mechanism, etc. Various technologies and techniques described herein are directed to seals and sealing that can reduce leakage of exhaust, for example, within a turbine assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

As described in various examples, exhaust leaks may occur in a turbine assembly. For example, exhaust may leak between two components of a turbine assembly such that the leaked exhaust bypasses a turbine wheel space. Where the leaked exhaust passes from a volute of a turbine assembly to an outlet of the turbine assembly, without passing through a turbine wheel space, the efficiency of the turbine assembly may decrease. Where components of a turbine assembly expand, contract, experience force, etc., exhaust leakage may vary and make turbine performance less predictable. Where a turbine wheel drives a compressor wheel to charge intake air for an internal combustion engine, variations in exhaust leakage can impact predictability of engine performance. Further, as many factors may be involved, one may not necessarily know a priori whether a larger pressure drop (e.g., larger backpressure) increases exhaust leakage and, if it does, whether such leakage has any significant impact on performance of a turbine, a compressor, an engine, etc.

As described herein, to mitigate exhaust leakage a turbine assembly may include an expansion seal. For example, a turbine assembly can include a turbine wheel that includes a base, a nose, blades, and a rotational axis that extends from the base to the nose; a shroud component that includes an axis aligned with the rotational axis of the turbine wheel, an inner shroud surface, a lower axial face, an upper axial face and an outer seal surface that extends between the lower axial face and the upper axial face; a turbine housing that includes an axis aligned with the rotational axis of the turbine wheel, a lower axial face, an upper axial face and an inner seal surface that extends between the lower axial face and the upper axial face; and an expansion seal that includes an axis aligned with the rotational axis of the turbine wheel, a lower lip disposed between the lower axial face of the shroud component and the lower axial face of the turbine housing, an upper lip disposed between the upper axial face of the shroud component and the upper axial face of the turbine housing, and a wall that extends between the lower lip and the upper lip, the wall disposed between the outer seal surface of the shroud component and the inner seal surface of the turbine housing.

In the foregoing example, the expansion seal may be deformable responsive to loading. Such deformability may allow the expansion seal to seal a space between two components over a wide range of conditions. For example, an expansion seal may deform responsive to force due to expansion or contraction of one or more components resulting from heating or cooling. As another example, an expansion seal may deform responsive to axial thrust forces that occur during operation of an exhaust turbine (e.g., as in a turbocharger). As yet another example, an expansion seal may deform in response to a load or loads applied to one or more components of a turbine assembly or a turbocharger assembly during an assembly process. In such an example, a bolt or other mechanism may be torqued according to a torque specification that results in a load (e.g., a "pre-load") being applied to an expansion seal seated between two or more components of an assembly.

As a particular example, an expansion seal may be positioned between a cartridge and a turbine housing of a variable geometry turbine assembly (e.g., consider a VGT assembly or a variable nozzle turbine "VNT" assembly). In such an example, there exists a so-called cartridge leakage path for exhaust gas which is detrimental to performance (e.g., turbocharger performance). One approach to mitigate such leakage involves use of one or more piston rings between the cartridge and the turbine housing. Unfortunately, such an approach may still allow for unacceptable levels of exhaust leakage (e.g., unacceptable in that they negatively impact performance of a turbocharger especially at low engine speed conditions). As described herein, an expansion seal can reduce exhaust leakage in comparison to the piston ring approach.

As an example, an expansion seal may act to maintain performance predictability of a turbine or turbocharger by withstanding bulk temperatures of approximately 800° C. and pressure differentials ($\Delta P_{max}$) of approximately 300 kPa. Such an expansion seal may result in lower leak rates than a piston ring approach, which may have a leak rate of approximately 15 to approximately 30 l/min under a pressure differential of approximately 50 kPa. As an example, an expansion seal may provide for lower stack-up limits (e.g., axial stack-up of components) and may comply with thermal evolution/growth during operation (e.g., and temperature cycling). As an example, an expansion seal may be configured to limit load applied to a cartridge. As an example, an expansion seal may be implemented without alteration to existing components (e.g., in terms of structure). For example, where a slot or slots exist for one or more piston rings, an expansion seal may be positioned in a manner where the slot or slots do not alter sealing ability of the expansion seal. As an alternative example, one or more components may be manufactured without machining or otherwise forming one or more slots.

As to pressure differentials and temperatures in a variable geometry turbine assembly, exhaust in a volute may have pressure in a range of approximately 120 kPa to approximately 400 kPa and possible peak pressure of up to approximately 650 kPa (absolute) and temperature in a range of approximately 200 degrees C. to approximately 830 degrees C. and possible peak temperature of up to approximately 840 degrees C.; whereas, at a location downstream blades of a turbine wheel, exhaust may have pressure in a range of approximately 100 kPa to approximately 230 kPa (absolute) and temperature in a range of approximately 100 degrees C. to approximately 600 degrees C. As described herein, as an example, an expansion seal may be made of a material and be configured to withstand pressures and temperatures in such ranges. For example, an expansion seal may be made of a material such as the INCONEL® 718 alloy (Specialty Materials Corporation, New Hartford, N.Y.). The INCONEL® 718 alloy includes nickel (e.g., 50-55% by mass), chromium (e.g., 17-21% by mass), iron, molybdenum, niobium, cobalt, aluminum and other elements. Some other examples of materials include INCONEL® 625, C263 (aluminum-titanium age hardening nickel), René 41 (nickel-based alloy), WASPALOY® alloy (age hardened austenitic nickel-based alloy, United Technologies Corporation, Hartford, Conn.), etc. As an example, an expansion seal may be shaped via a stamping process (e.g., for shaping material provided as a sheet, optionally from a roll).

As an example, an expansion seal may be configured for ease of assembly, optionally without any specialized jigs, tools, etc. As an example, upon assembly (e.g., at ambient or room temperature), an expansion seal may be positioned between two or more components and loaded to exert a particular force on a cartridge (e.g., X N) in a first axial direction where another load may be applied to the cartridge (e.g., Y N) by another component in a second, opposing axial direction, for example, to help maintain axial location of the cartridge. In such an example, the load Y applied to the cartridge by the component exceeds the load X applied to the cartridge by the expansion seal (e.g., |Y|>|X|). In such an example, the resulting load on the cartridge (e.g., at ambient or room temperature) may be determined as |Y| minus |X|, in the direction of Y. The resulting load on the cartridge can help maintain its axial location in a turbine assembly (e.g., or in a turbocharger assembly). During operation, for example, where temperature and exhaust pressure are acting simultaneously, the load exerted by the expansion seal may diminish and, in turn, the resulting load experienced by the cartridge may increase.

As mentioned, an expansion seal may be deformable in a manner that results in expansion of the expansion seal (e.g., where the expansion seal is expandable). As an example, an expansion seal may be provided in an unloaded state that provides for an axial expansion $\Delta z$ characterized by exposing the expansion seal a particular pressure (e.g., approximately 300 kPa) at room temperature as well as at an elevated temperature (e.g., approximately 800 degrees C.). Depending on the particular use, clearance or clearances between components to be sealed, etc., the axial expansion may be of the order of a few millimeters or less and optionally on the order of a millimeter or less (e.g., for an expansion seal with a lip at each end). As an example, an expansion seal may undergo a negligible level of plastic strain during operation (e.g., at an exhaust temperature of approximately 800 degrees C.). As to a duty cycle of a turbocharger, temperature may vary from approximately 200 degrees C. to approximately 800 degrees C. where load may vary correspondingly. Such variations in load may result in variations of expansion (e.g., of the order of about 50% of $\Delta z$), which may correspond to variations in a clearance or clearances between two or more components. As an example, an expansion seal may offer near linear stiffness during thermal cycling (e.g., for an expected duty cycle). While an axial expansion is mentioned in the foregoing example, in another example, an expansion seal may provide for radial expansion (see, e.g., FIG. 9) between two components.

Below, an example of a turbocharged engine system is described followed by various examples of components, assemblies, methods, etc.

Figure 1:
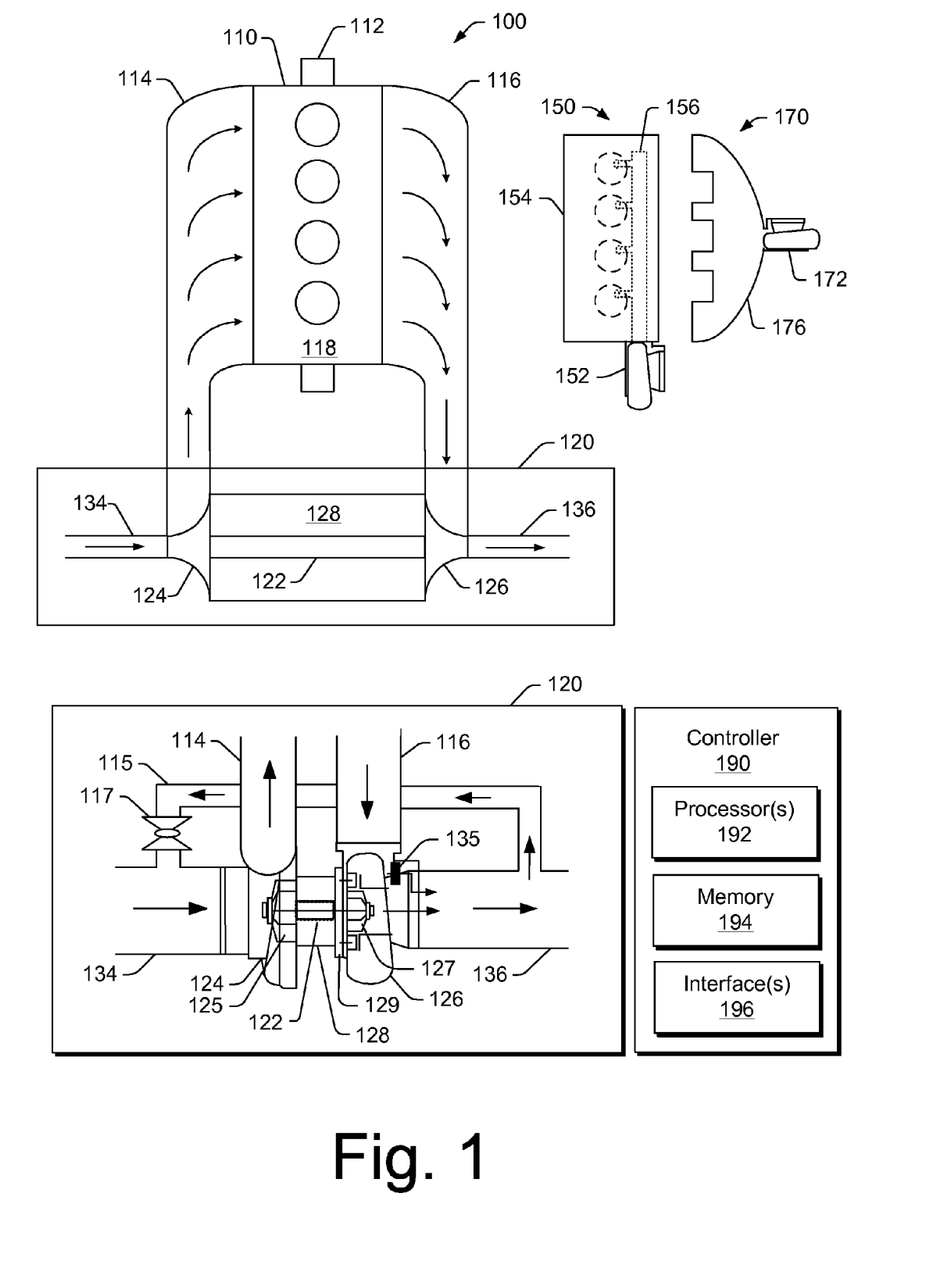
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing 124 for a compressor wheel 125, a turbine housing 126 for a turbine wheel 127, another housing 128 and an exhaust outlet 136. The housing 128 may be referred to as a center housing as it is disposed between the compressor housing 124 and the turbine housing 126. The shaft 122 may be a shaft assembly that includes a variety of components. The shaft 122 may be rotatably supported by a bearing system (e.g., journal bearing(s), rolling element bearing(s), etc.) disposed in the housing 128 (e.g., a bore defined by one or more bore walls) such that rotation of the turbine wheel 127 causes rotation of the compressor wheel 125 (e.g., as rotatably coupled by the shaft 122).

In the example of FIG. 1, a variable geometry assembly 129 is shown as being, in part, disposed between the housing 128 and the housing 126. Such an assembly may include vanes or other components to vary geometry of passages that lead to a turbine wheel space in the turbine housing 126. As an example, a variable geometry compressor unit may be provided.

In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126. Further, an exhaust gas recirculation (EGR) conduit 115 may be provided, optionally with one or more valves 117, for example, to allow exhaust to flow to a position upstream the compressor wheel 125.

FIG. 1 also shows an example arrangement 150 for flow of exhaust to an exhaust turbine housing 152 and another example arrangement 170 for flow of exhaust to an exhaust turbine housing 172. In the arrangement 150, a cylinder head 154 includes passages within to direct exhaust from cylinders to the turbine housing 152 while in the arrangement 170, a manifold 176 provides for mounting of the housing 172, for example, without any separate, intermediate length of exhaust piping. In the example arrangements 150 and 170, the turbine housings 152 and 172 may be configured for use with a variable geometry assembly such as the assembly 129 or, for example, other assemblies described herein.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc.

Figure 2:
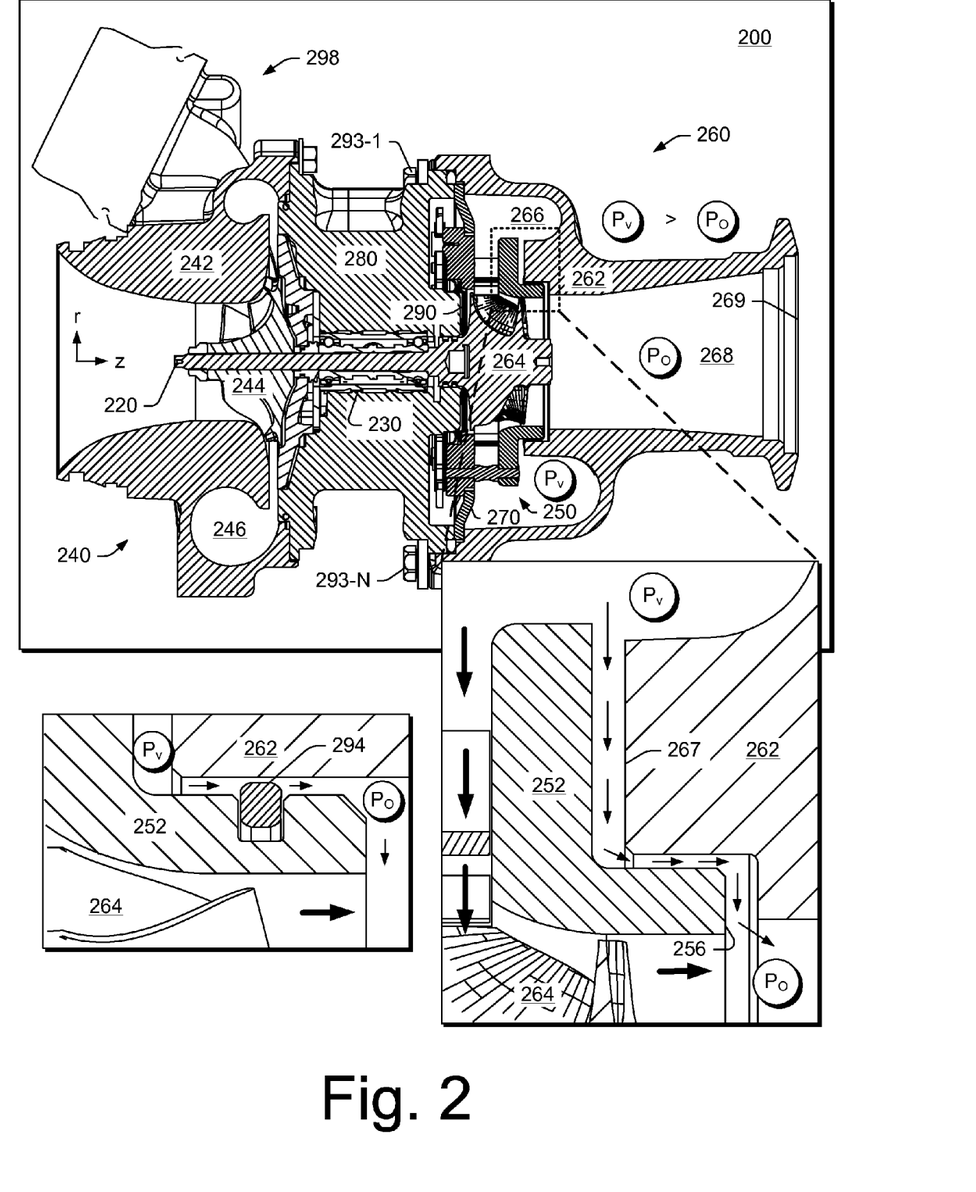
FIG. 2 is a cross-sectional view of an example of a turbocharger assembly.

FIG. 2 shows an example of a turbocharger assembly 200 that includes a shaft 220 supported by a bearing assembly 230 (e.g., a rolling element bearing) disposed in a bore (e.g., a through bore defined by one or more bore walls) of a housing 280 between a compressor assembly 240 and a turbine assembly 260. The compressor assembly 240 includes a compressor housing 242 that defines a volute 246 and that houses a compressor wheel 244. The turbine assembly 260 includes a turbine housing 262 that defines a volute 266 and that houses a turbine wheel 264. The turbine wheel 264 may be, for example, welded or otherwise attached to the shaft 220 to form a shaft and wheel assembly ("SWA") where a free end of the shaft 220 allows for attachment of the compressor wheel 244.

The turbine assembly 260 further includes a variable geometry assembly 250, which may be referred to as a "cartridge", that is positioned using a flange 270 (e.g., optionally shaped as a stepped annular disc) that clamps between the housing 280 and the turbine housing 262, for example, using bolts 293-1 to 293-N and a heat shield 290 (e.g., optionally shaped as a stepped annular disc), the latter of which is disposed between the cartridge 250 and the housing 280. As shown in the example of FIG. 2, the cartridge 250 is positioned between the flange 270 and the heat shield 290 where the heat shield may exert a load in a direction axially outward, away from the housing 280; noting that in the example of FIG. 2, the turbine housing 262 does not directly contact the cartridge 250. As to the flange 270 and the heat shield 290, they may have an outer radius and an inner radius where the inner radius of the flange 270 exceeds the outer radius of the heat shield 290 and where the flange 270 and the heat shield 290 may be centered on an axis (e.g., rotational axis of the shaft 220) and may optionally be positioned within a common plane (e.g., a plane orthogonal to the axis). As shown in FIG. 2, a portion of the cartridge 250 occupies a space between the outer radius of the heat shield 290 and the inner radius of the flange 270.

As to exhaust flow, higher pressure exhaust in the volute 266 passes through passages of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_V$) is greater than the exhaust pressure in the passage 268 ($P_O$).

As shown in two enlarged views of the example of FIG. 2, a clearance exists between the turbine housing 262 and the cartridge 250. Specifically, a clearance exists between a surface 256 of a component 252 of the cartridge 250 and a surface 267 of the turbine housing 262. As mentioned, a piston ring approach to sealing a passage formed by a clearance can involve positioning a piston ring in a slot. The enlarged views of FIG. 2 show an example without a piston ring (lower right) and another example with a piston ring 294 positioned in an effort to seal such a passage (lower left). As described herein, an expansion seal may be used in an effort to seal such a passage. Depending on size, shape, orientation of an expansion seal in an assembly, a piston ring may optionally be included to assist with sealing.

Figure 3:
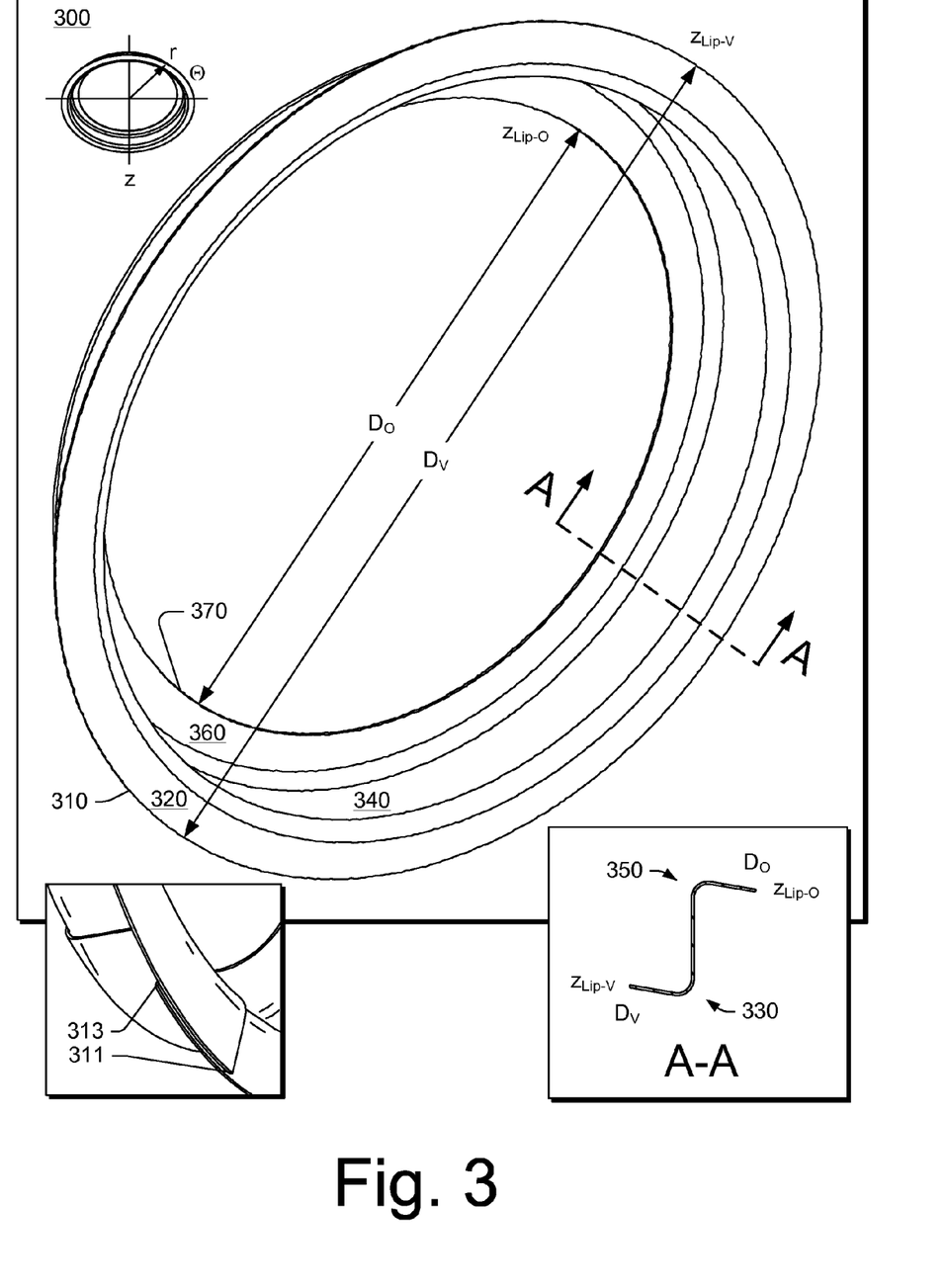
FIG. 3 is a series of views of an example of an expansion seal optionally suitable for use with the turbocharger of FIG. 2.

FIG. 3 shows an example of an expansion seal 300, which may be formed as a contiguous ring or optionally with overlapping ends 311 and 313. The expansion seal 300 may be defined with respect to a cylindrical coordinate system having radial, axial and azimuthal coordinates r, z and Θ, respectively. In the example of FIG. 3, the seal 300 includes an edge 310 of a lip 320 that leads to a wall 340 that extends to another lip 360 having an edge 370. The edge 310 may be characterized by a diameter $D_V$ at an axial position $z_{Lip\text{-}V}$ while the edge 370 may be characterized by a diameter $D_O$ at an axial position $z_{Lip-O}$. In the example of FIG. 3, the subscript "V" may represent "volute" for a volute side while the subscript "O" may represent "outlet" for an outlet side of the expansion seal 300. A cross-sectional view along a line A-A of the expansion seal 300 is also shown in FIG. 3 to illustrate a bend 330 between the lip 320 and the wall 340 and another bend 350 between the wall 340 and the lip 360. As to expansion, the lip 320 and the lip 360 may flex with respect to the wall 340 where such flexure changes angles of the bends 330 and 350 to increase axial distance between the edge 310 and the edge 370.

As mentioned, an expansion seal may be formed by a stamping process, for example, where a sheet of material is stamped and optionally cut to form an expansion seal such as the expansion seal 300 of FIG. 3. As another example, a rolling process may be implemented to shape material from a roll, which may be cut into pieces. For example, a rolling process may form pieces with ends that can form a ring, optionally with overlap (see, e.g., ends 311 and 313).

Figure 4:
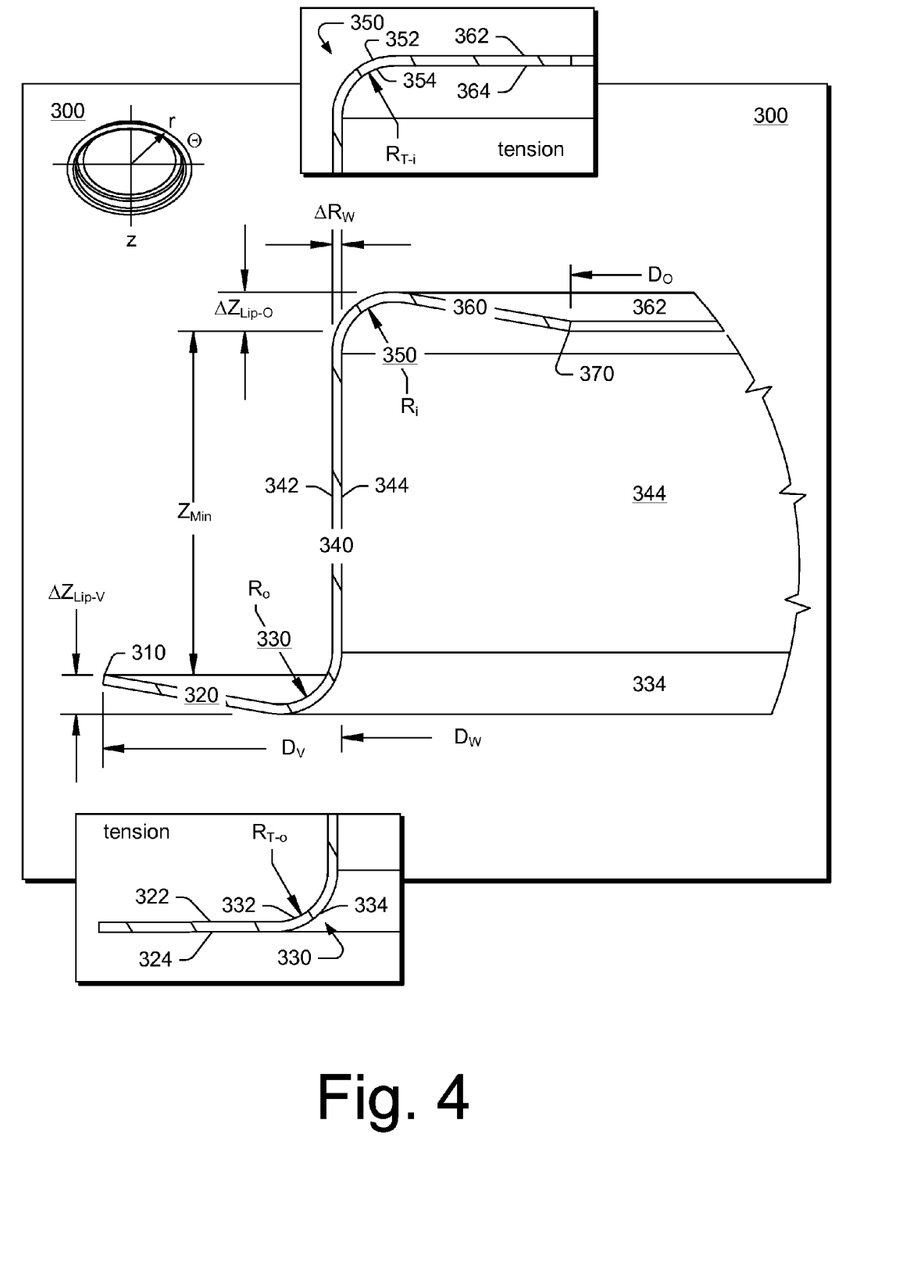
FIG. 4 is a cutaway view of the expansion seal of FIG. 3.

FIG. 4 shows a cutaway view of the expansion seal 300 of FIG. 3 along with views of the lips 320 and 360 in a tension state (e.g., flexed state). As shown in the example of FIG. 4, the expansion seal 300 includes an inner surface and an outer surface. The inner and the outer surfaces extend from the edge 310 to the edge 370. The inner surfaces include an inner surface 324 of the lip 320, an inner surface 334 of the bend 330, an inner surface 344 of the wall 340, an inner surface 354 of the bend 350, and an inner surface 364 of the lip 360. The outer surfaces include an outer surface 322 of the lip 320, an outer surface 332 of the bend 330, an outer surface 342 of the wall 340, an outer surface 352 of the bend 350, and an outer surface 362 of the lip 360.

Various dimensions are shown in FIG. 4, including a minimum axial distance $Z_{Min}$, a lip deviation $\Delta Z_{Lip-O}$ and a lip deviation $\Delta Z_{Lip-V}$, a wall width $\Delta R_W$, a wall diameter $D_W$, an edge diameter $D_V$ and an edge diameter $D_O$, and a bend radius $R_o$ and a bend radius $R_i$ and a tensioned bend radius $R_{T-o}$ and a tensioned bend radius $R_{T-i}$. When installed, the expansion seal 300 may be configured to expand where the lower lip 320 and upper lip 360 each maintain an acute angle with respect to the wall 340, for example, an acute angle less than approximate 90 degrees (e.g., to avoid non-elastic deformation). In the example of FIG. 4, the tensioned bend radii $R_{T-o}$ and $R_{T-i}$ (e.g., approximately 90 degrees for the lips 320 and 360 in the example of FIG. 4) may be considered operational limits for a tensioned state (e.g., a prolonged tensioned state).

Figure 5:
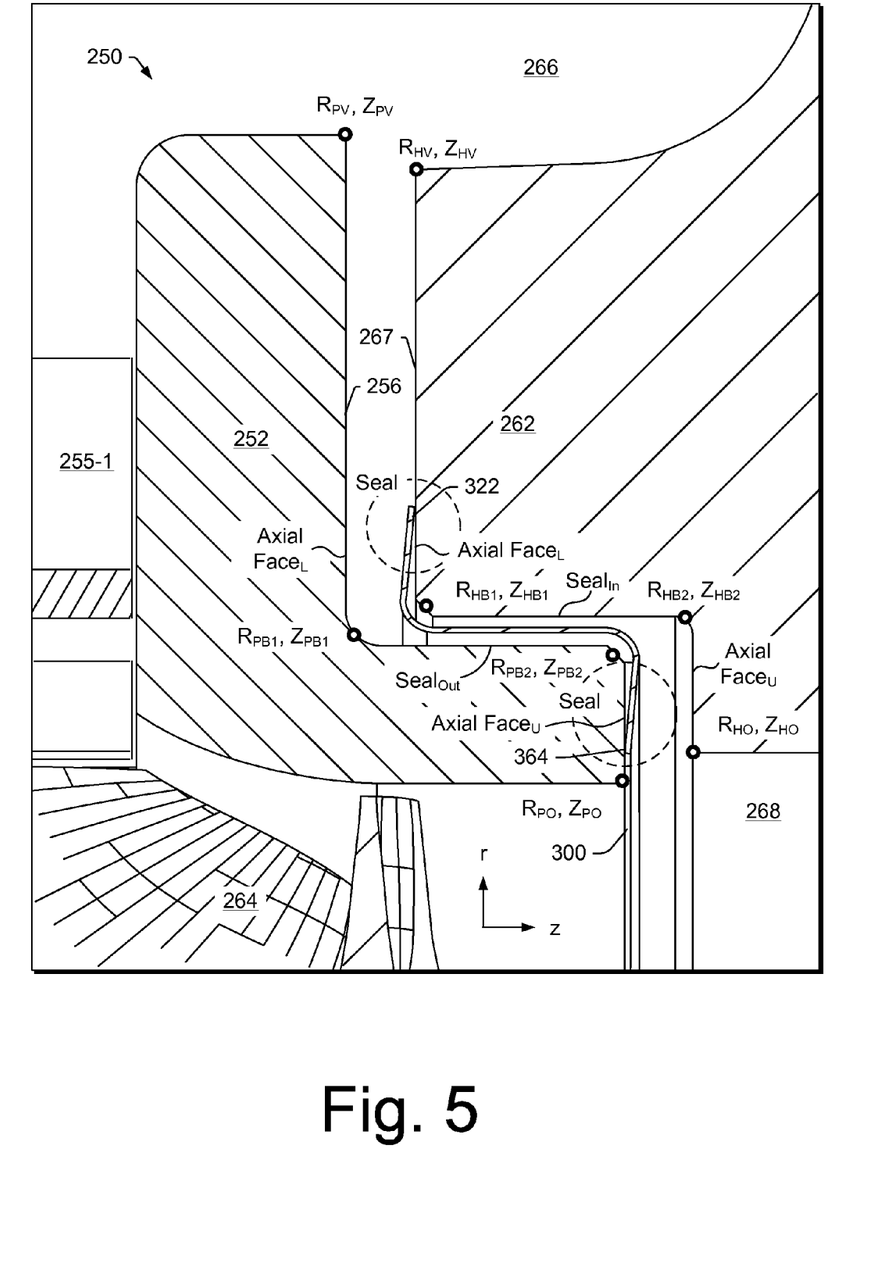
FIG. 5 is a cross-sectional view of a portion of the turbocharger assembly of FIG. 2 that includes the expansion seal of FIGS. 3 and 4.

FIG. 5 shows a cross-sectional view of a portion of the assembly 200 of the example of FIG. 2 that now includes the expansion seal 300 in a tension state. FIG. 5 shows the volute 266, as defined at least in part by the turbine housing 262, the passage 268, as defined at least in part by the turbine housing 262, a vane 255-1 disposed in an exhaust passage defined by the cartridge 250 (e.g., a passage defined by the component 252 and another component, which is not shown in FIG. 5), and the turbine wheel 264 as including blades.

As shown, with respect to various coordinates, clearances between the surface 256 of the component 252 and the surface 267 of the turbine housing 262 define a passage in which the expansion seal 300 may be disposed. The component 252 may be referred to as a "pipe" as it has a cylindrical end that forms an outlet for exhaust downstream blades of the turbine wheel 264 or it may be referred to as a shroud component as it forms a shroud for the turbine wheel 264 along an inner surface. In FIG. 5, the subscript "P" refers to "pipe" (i.e., the component 252) whereas the subscript "H" refers to the turbine housing 262; the subscript "V" refers to volute and the subscript "O" refers to outlet, generally a position or positions downstream blades of the turbine wheel 264; and the subscript "B" refers to bend for one of the various bends (e.g., or shoulders).

FIG. 5 also includes labels for a lower axial face and an upper axial face of the component 250, a lower axial face and an upper axial face of the turbine housing 264, and an outer seal surface of the component 252 and an inner seal surface of the component 262.

As shown in the example of FIG. 5, the expansion seal 300 forms a seal along the outer surface 322 of the lip 320 and the lower axial face of the turbine housing 262 and forms another seal along the inner surface 364 of the lip 360 and the upper axial face of the component 252. In such a manner, the expansion seal 300 hinders flow of exhaust from the volute 266 to the passage 268. Such a hindrance promotes flow of exhaust through passages or nozzles formed by the vanes (see, e.g., the vane 255-1) of the cartridge 250.

As mentioned, a clearance or clearances between components may change with respect to various conditions. For example, in the example of FIG. 5, the (R, Z) coordinates may change and thereby alter one or more clearances (e.g., as one or more surface positions change). In response, the expansion seal 300 may expand or contract while still acting as a hindrance for flow of exhaust from the volute 266 to the passage 268 in the space defined by the surfaces 256 and 267.

In the example of FIG. 5, the outer surface 322 of the lip 320 extends away from the wall 340 at an acute angle that due to tension is greater than an acute angle of the outer surface 322 of the lip 320 when the expansion seal 300 is in a relaxed state (e.g., prior to installation). In the example of FIG. 5, the inner surface 364 of the lip 360 extends away from the wall 340 at an acute angle that due to tension is greater than an acute angle of the inner surface 364 of the lip 360 when the expansion seal 300 is in a relaxed state (e.g., prior to installation). In the example of FIG. 5, the outer surface 322 extends from the bend 330 to the edge 310 and, over a range of acute angles with respect to the wall 340, may be in contact with the lower axial face of the turbine housing 262 and the inner surface 364 extends from the bend 350 to the edge 370 and, over a range of acute angles with respect to the wall 340, may be in contact with the upper axial face of the component 252.

Figure 6:
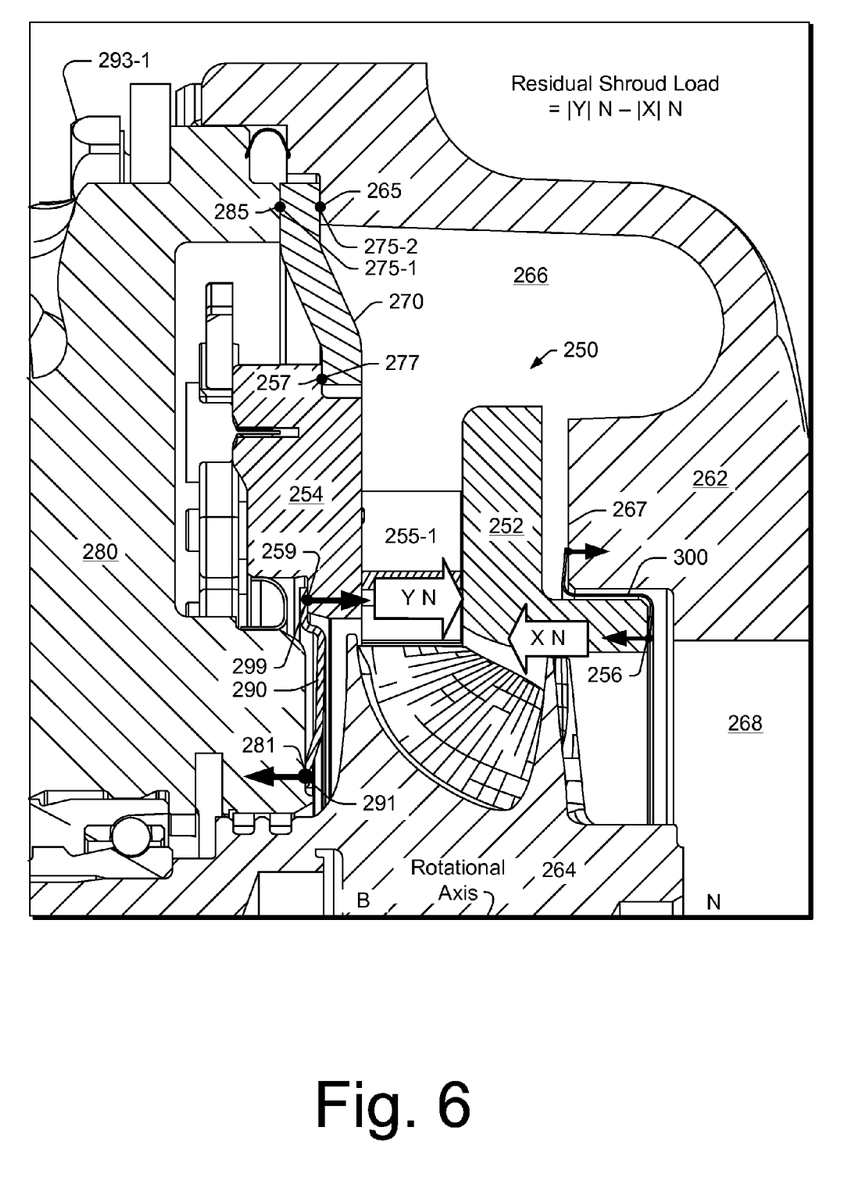
FIG. 6 is a cross-sectional view of a portion of the turbocharger assembly of FIG. 2 that includes the expansion seal of FIGS. 3 and 4.

FIG. 6 shows another enlarged cross-sectional view of the assembly 200 of FIG. 2 that now includes the expansion seal 300 in a tension state. In the example of FIG. 6, various arrows indicate force (approximately in direction and only as rough estimate in terms of magnitude) while filled circles indicate contacts formed between various components.

As to the flange 270, this may have an annular shape where an inner edge at an inner radius is displaced axially from an outer edge at an outer radius. As shown in the example of FIG. 6, the flange 270 forms a contact between a surface 275-1 and a surface 285 of the center housing 280, forms a contact between a surface 275-2 and a surface 265 of the turbine housing 262, and forms a contact between a surface 277 and a surface 257 of a component 254 of the cartridge 250; noting that the components 252 and 254 form an exhaust passage in which the vane 255-1 is disposed.

As to the heat shield 290, this may have an annular shape defined by an inner radius and an outer radius. As shown in the example of FIG. 6, the heat shield 290 forms a contact between a surface 291 and a surface 281 of the center housing, and forms a contact between a surface 299 and a surface 259 of the component 254 of the cartridge 250.

As to the force arrows, clamping of the flange 270 between the center housing 280 and the turbine housing 262 acts to limit outward axial movement of the cartridge 250 responsive to axially outward force Y applied to the cartridge 250 by the heat shield 290 while the expansion seal 300 exerts axially inward force X on the cartridge 250 as it pushes axially outward on the turbine housing 262 (e.g., due to the clamping of the turbine housing 262 to the center housing 280). For reference as to axial directions, a rotational axis is shown for the turbine wheel 264 as extending between a base ("B") and a nose ("N") where the direction from B to N is outward and the direction from N to B is inward. As an example, the cartridge 250, the expansion seal 300 and the turbine housing 262 may be aligned with the rotational axis (e.g., via the flange 270, the heat shield 290, the bolts 293-1, etc.).

As an example, a residual shroud load equation is shown in FIG. 6 where the term "shroud" refers generally to the cartridge 250 as it includes the shroud component 252. The equation indicates that the residual load may be determined by subtracting the absolute value of X (e.g., magnitude in axial direction) from the absolute value of Y (e.g., magnitude in axial direction). In general, the residual shroud load is positive and directed axially outward to maintain the axial location of the cartridge 250. For example, as the cartridge 250 includes a shroud for the turbine wheel 264, its location with respect to the turbine wheel 264 should be maintained (e.g., within some tolerable range for purposes of performance and to avoid risk of contact between the shroud of the cartridge 250 and the blades of the turbine wheel 264). Accordingly, as an example, the amount of force applied by the expansion seal 300 may be balanced against requirements for axially locating the cartridge 250 for a range of operational, environmental or other conditions. As mentioned, during operation a turbocharger can experience axial thrust loads that may cause components to shift. Further, temperature, pressure and other factors may be considered as to displacement of one or more components (e.g., by movement, thermal expansion, thermal contraction, rotational forces, etc.). In such an example, characteristics of an expansion seal may be selected to enhance sealing while still providing acceptable axial locating of a cartridge or other component (e.g., against which a seal is being formed).

Figure 7:
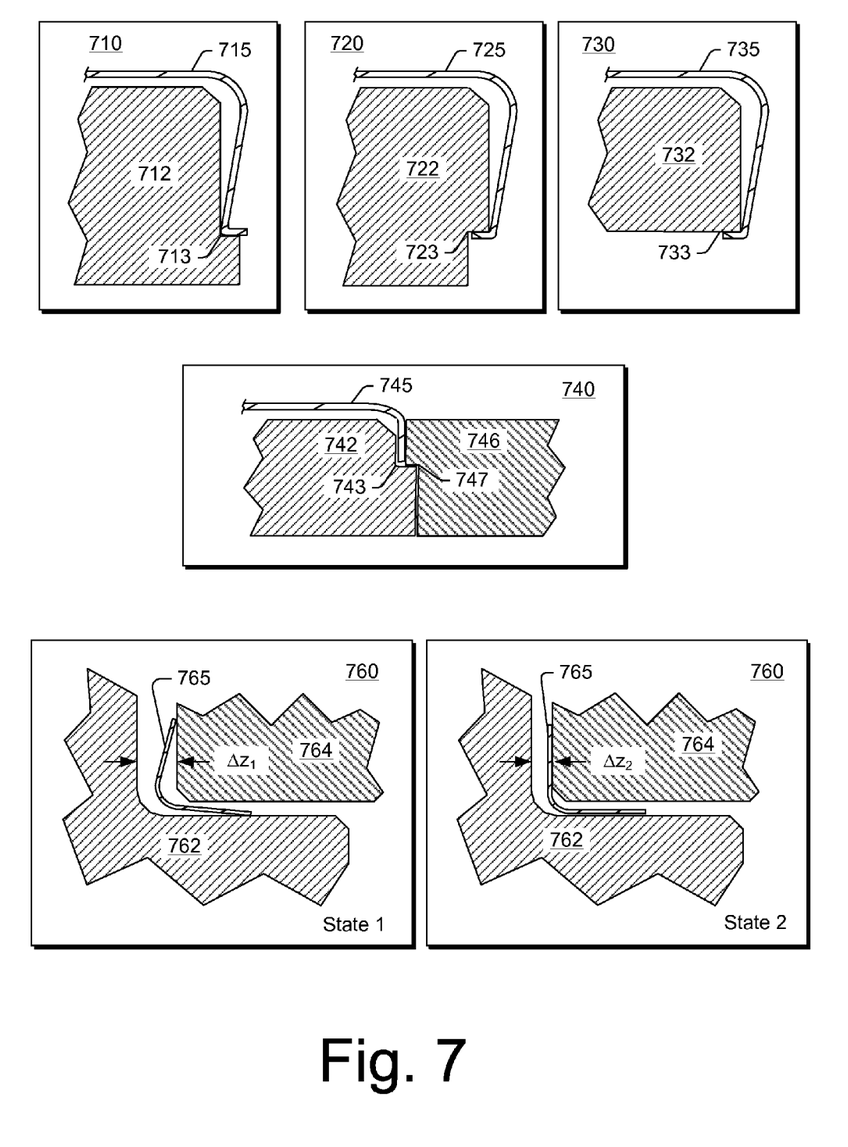
FIG. 7 is a series of cross-sectional views of examples of assemblies that include an expansion seal.

FIG. 7 shows various examples of expansion seals in cross-sectional views (e.g., through a cylindrically shaped portion of an assembly). An example assembly 710 shows an expansion seal 715 configured for seating with an outwardly facing end against a shoulder 713 of a component 712. An example assembly 720 shows an expansion seal 725 configured for seating with an inwardly facing end against a shoulder 723 of a component 722. An example assembly 730 shows an expansion seal 735 configured for seating with an inwardly facing end against a surface of a component 732. An example assembly 740 shows an expansion seal 745 as disposed between two components 742 and 746, for example, where a shoulder 743 of the component 742 aligns with a shoulder 747 of the component 746. As shown, an end of the expansion seal 745 sits in a gap between the two components 742 and 746, which may form a "pipe" of a cartridge for passage of exhaust. In the foregoing examples, the expansion seals 715, 725, 735 and 745 may be provided in a relaxed state and then tensioned between two or more components of the assemblies 710, 720, 730 and 740.

FIG. 7 also shows an example of an expansion seal 765 as part of an assembly 760 in a first state and a second state. The expansion seal 765 includes a single lip and a wall where the lip and wall form an acute angle. In the first state, the expansion seal 765 is positioned between a component 762 and a component 764 while maintaining the acute angle where a clearance $\Delta z_1$ exists between surfaces of the components 762 and 764. In the second state, the clearance is narrowed to $\Delta z_2$ and the expansion seal "expands" under tension such that the angle between the lip and the wall approaches approximately 90 degrees. To maintain its expandability, the expansion seal 765 may be configured for positioning in an assembly where the angle between the lip and the wall does not exceed approximately 90 degrees as the material may deform to an extent where it loses some of its springiness or elasticity.

Figure 8:
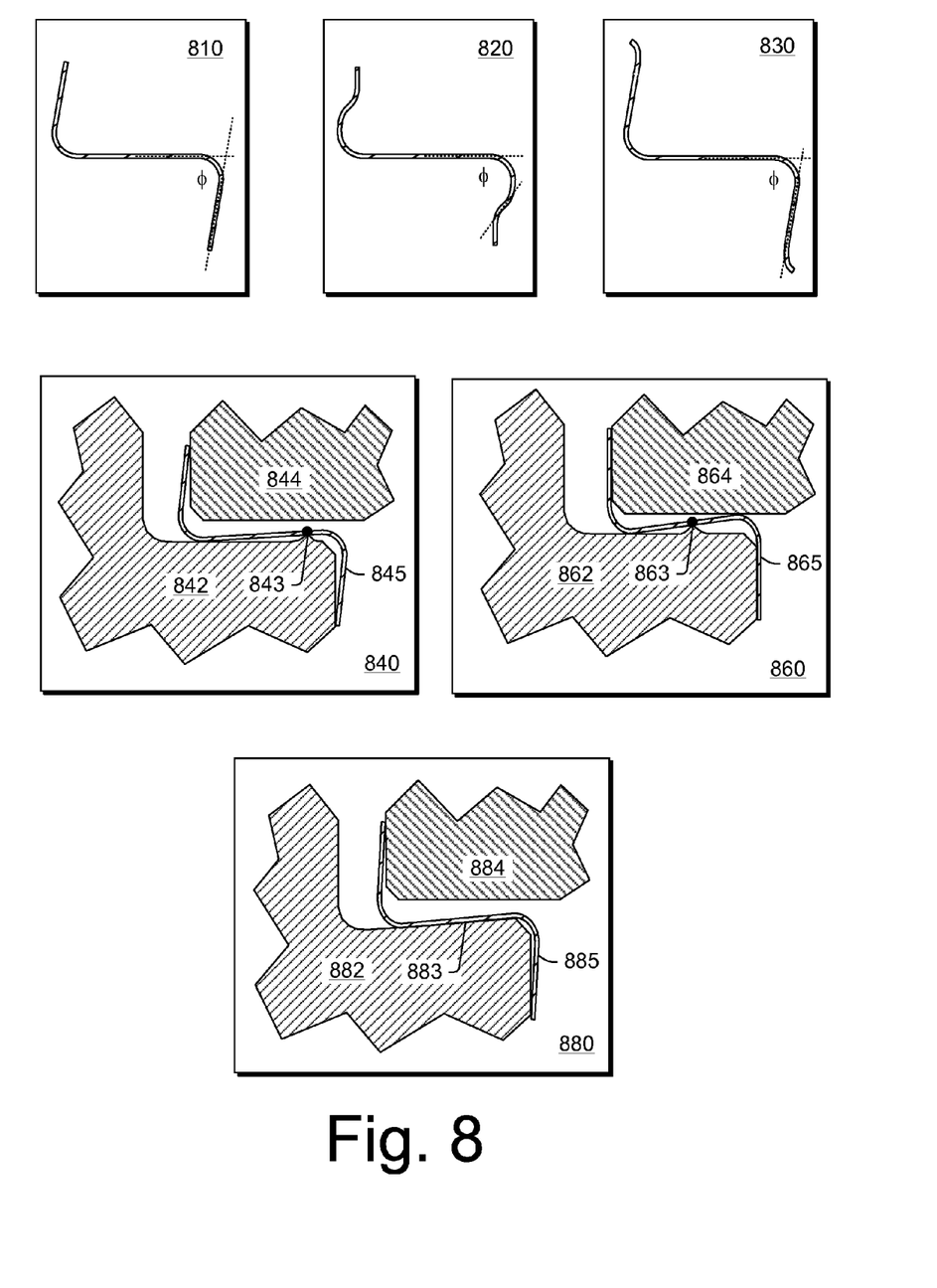
FIG. 8 is a series of cross-sectional views of examples of expansion seals and examples of assemblies that include an expansion seal.

FIG. 8 shows various examples of expansion seals 810, 820 and 830. The expansion seal 810 includes an angle φ between a wall and a lip, which may be an acute angle. The expansion seal 820 includes an angle φ between a wall and a portion of a lip, which may be an acute angle. The expansion seal 830 includes an angle φ between a wall and a portion of a lip, which may be an acute angle. As to the expansion seal 820, it includes a ridged lip, for example, which may be an annular ridge characterized by a radius. In such an example, the ridge may provide for contact a radial distance from an edge and may help to avoid contact between the expansion seal and a sharp edge of a component. As to the expansion seal 830, an edge of a lip may be angled, for example, to avoid contact between an edge of the expansion seal and a component.

FIG. 8 also shows examples of three assemblies 840, 860 and 880 where a component may include one or more features that cooperate with an expansion seal. In the assembly 840, an expansion seal 845 is disposed between a component 842 and a component 844 where the component 842 includes an outwardly extending ridge (or ridges or bumps) that act as contact points or leverage points for the expansion seal 845. Such a feature or features may alter the manner by which force is applied by the expansion seal, for example, where a particular force or force profile is to be maintained. Further, such a feature or features may help to enhance sealing, for example, by direct contact or by altering force under one or more conditions (e.g., temperature, pressure, thrust, etc.). As an example, a contact or leverage feature or features may enable an expansion seal to be retained within or with respect to another component, which may aid assembly (e.g., where the expansion seal remains paired during logistics and during assembly with other components).

In the assembly 860, an expansion seal 865 is disposed between a component 862 and a component 864 where the component 862 includes an outwardly extending ridge (or ridges or bumps) that act as contact points or leverage points for the expansion seal 865. In comparison to the ridge 843 of the example assembly 840, the ridge 863 is positioned at a different location, which may cause the expansion seal 865 to contact the component 862 and the component 864, optionally via control deformation or position (e.g., where the ridge 863 acts as a fulcrum). As mentioned, a contact or leverage feature or features may enable an expansion seal to be retained within or with respect to another component, which may aid assembly (e.g., where the expansion seal remains paired during logistics and during assembly with other components).

In the assembly 880, an expansion seal 885 is disposed between a component 882 and a component 884 where the component 882 includes a surface 883 disposed at a radius that increases with respect to axial position. The surface 883 may act to form more intimate contact (e.g., over a larger portion) of the expansion seal 885. As mentioned, a contact or leverage feature or features may enable an expansion seal to be retained within or with respect to another component, which may aid assembly (e.g., where the expansion seal remains paired during logistics and during assembly with other components).

Figure 9:
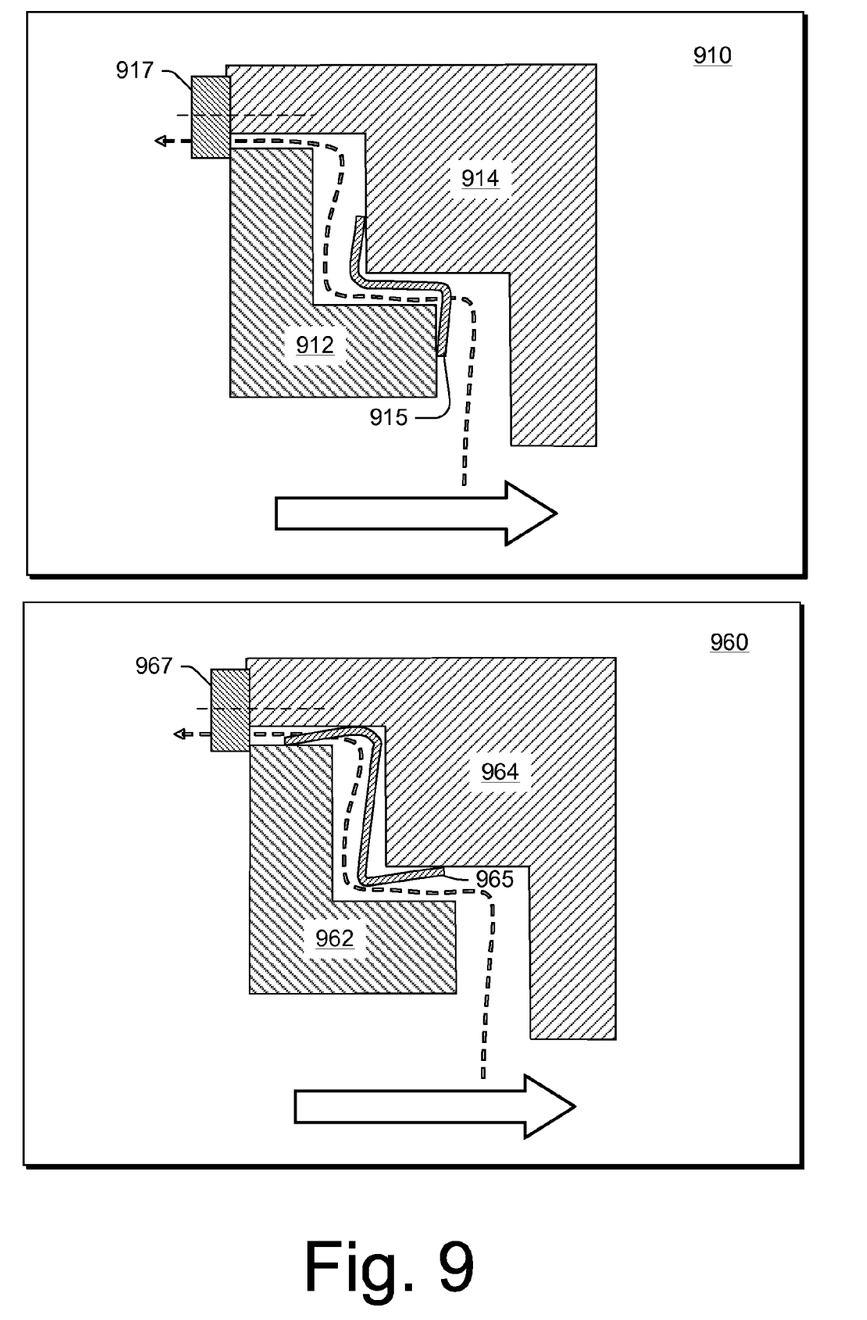
FIG. 9 is a series of cross-sectional views of examples of assemblies that include an expansion seal.

FIG. 9 shows example assemblies 910 and 960. In the assembly 910, an expansion seal 915 is disposed between two components 912 and 914, which may be connected using a bolt 917. A large arrow indicates a main direction of flow and a small arrow indicates possible leakage. As shown, the expansion seal 915 can hinder leakage of exhaust between the two components 912 and 914. Further, if the components 912 and 914 move (e.g., responsive to force, temperature, etc.) in the direction of flow or orthogonally to the direction of flow, the expansion seal 915 can slide over the components 912 and 914, expand or contract to maintain at least some of its sealing ability.

In the assembly 960, an expansion seal 965 is disposed between two components 962 and 964, which may be connected using a bolt 967. A large arrow indicates a main direction of flow and a small arrow indicates possible leakage. As shown, the expansion seal 965 can hinder leakage of exhaust between the two components 962 and 964. Further, if the components 962 and 964 move (e.g., responsive to force, temperature, etc.) in the direction of flow or orthogonally to the direction of flow, the expansion seal 965 can expand or contract or slide over the components 962 and 964 to maintain at least some of its sealing ability. In the example assembly 960, the expansion seal 965 includes lips that extend primarily in axial directions away from a wall (e.g., radial wall) whereas in the example assembly 910, the expansion seal 915 includes lips that extend primarily in radial directions away from a walls (e.g., axial wall).

As an example, a turbine assembly can include a turbine wheel that includes a base, a nose, blades, and a rotational axis that extends from the base to the nose; a shroud component that includes an axis aligned with the rotational axis of the turbine wheel, an inner shroud surface, a lower axial face, an upper axial face and an outer seal surface that extends between the lower axial face and the upper axial face; a turbine housing that includes an axis aligned with the rotational axis of the turbine wheel, a lower axial face, an upper axial face and an inner seal surface that extends between the lower axial face and the upper axial face; and an expansion seal that includes an axis aligned with the rotational axis of the turbine wheel, a lower lip disposed between the lower axial face of the shroud component and the lower axial face of the turbine housing, an upper lip disposed between the upper axial face of the shroud component and the upper axial face of the turbine housing, and a wall that extends between the lower lip and the upper lip, the wall disposed between the outer seal surface of the shroud component and the inner seal surface of the turbine housing. In such an example, the lower lip of the expansion seal may extend radially outwardly from the wall and the upper lip of the expansion seal may extend radially inwardly from the wall.

As an example, an expansion seal can include a relaxed state and a tension state (or tensioned state). In such an example, for a relaxed state, a lower lip may extend outwardly from a wall at an acute angle and, for the tension state, the lower lip may extends outwardly at a greater, acute angle to the wall (e.g., an angle approaching but less than approximately 90 degrees). In such an example, for the relaxed state, an upper lip may extend inwardly from a wall at an acute angle and, for the tension state, the upper lip may extend inwardly at a greater, acute angle to the wall (e.g., an angle approaching but less than approximately 90 degrees).

As an example, a turbine assembly may include an expansion seal that contacts a shroud component and that contacts a turbine housing. In such an example, the expansion seal may be loaded via the contacts with the shroud component and the turbine housing. As an example, a lower axial face of the turbine housing and an upper axial face of the shroud component may load the expansion seal.

As an example, a turbine assembly may include a shroud component of a variable geometry cartridge where an expansion seal contacts the shroud component and another component to form a seal.

As to a turbine assembly, a turbine housing may define, at least in part, a volute and a lower axial face of a shroud component may extend radially outwardly to the volute and a lower axial face of the turbine housing may extend radially outwardly to the volute. As an example, a lower axial face of a shroud component and a lower axial face of a turbine housing may form an annular passage in fluid communication with an exhaust volute and where an expansion seal seals an end of the annular passage.

As an example, a turbine assembly may include an upper axial face of a shroud component and an upper axial face of a turbine housing that form an annular passage in fluid communication with an exhaust outlet at an axial position downstream from blades of a turbine wheel where an expansion seal seals an end of the annular passage.

As an example, a turbine assembly may include an inner perimeter of an upper axial face of a shroud component that defines an outlet for exhaust at an axial position downstream blades of a turbine wheel. As an example, a turbine assembly may include an inner perimeter of an upper axial face of a turbine housing that defines an inlet for exhaust at an axial position downstream blades of a turbine wheel.

As an example, a turbine assembly may include, at an axial position along the rotational axis of the turbine wheel, an inner shroud surface of a shroud component at a first diameter, an outer seal surface of the shroud component at a second diameter, a wall of an expansion seal at a third diameter, an inner seal surface of a turbine housing at a fourth diameter wherein the first, second, third and fourth diameters are concentric (e.g., aligned about a rotational axis of a turbine wheel of the turbine assembly).

As an example, a method can include providing a center housing, a heat shield, a variable geometry cartridge, a flange, a turbine housing and an expansion seal; positioning the heat shield on the center housing, positioning the variable geometry cartridge on the heat shield, positioning the flange on the variable geometry cartridge and positioning the expansion seal on the variable geometry cartridge to form an assembly; and attaching the turbine housing to the assembly to form a turbocharger and to thereby apply a load to the variable geometry cartridge via the heat shield and the expansion seal. Such a method may further include operating the turbocharger and expanding or contracting the expansion seal between the variable geometry cartridge and the turbine housing. Such a method may further include maintaining an axial load on the variable geometry cartridge to axially locate the variable geometry cartridge against the flange.

As an example, a turbocharger assembly can include a compressor wheel disposed in a compressor housing; a center housing that includes a bore and a bearing system disposed in the bore, the compressor housing attached to the center housing; a shaft and turbine wheel assembly that includes a shaft portion, a turbine wheel portion, and a rotational axis where the compressor wheel is attached to the shaft portion and the shaft portion is rotatably supported by the bearing system disposed in the bore of the center housing; a heat shield positioned on the center housing; a variable geometry cartridge positioned on the heat shield where the variable geometry cartridge includes a shroud component that includes an axis aligned with the rotational axis of the turbine wheel, an inner shroud surface, a lower axial face, an upper axial face and an outer seal surface that extends between the lower axial face and the upper axial face; a flange positioned on the variable geometry cartridge; a turbine housing attached to the center housing to clamp the flange therebetween where the turbine housing includes an axis aligned with the rotational axis of the turbine wheel, a lower axial face, an upper axial face and an inner seal surface that extends between the lower axial face and the upper axial face; and an expansion seal that includes an axis aligned with the rotational axis of the turbine wheel, a lower lip disposed between the lower axial face of the shroud component and the lower axial face of the turbine housing, an upper lip disposed between the upper axial face of the shroud component and the upper axial face of the turbine housing, and a wall that extends between the lower lip and the upper lip, the wall disposed between the outer seal surface of the shroud component and the inner seal surface of the turbine housing.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbine assembly comprising:
   a turbine wheel that comprises a base, a nose, blades, and a rotational axis that extends from the base to the nose;
   a shroud component that comprises an axis aligned with the rotational axis of the turbine wheel, an inner shroud surface, a lower axial face, an upper axial face and an outer seal surface that extends between the lower axial face and the upper axial face;
   a turbine housing that comprises an axis aligned with the rotational axis of the turbine wheel, a lower axial face, an upper axial face and an inner seal surface that extends between the lower axial face and the upper axial face; and
   an expansion seal that comprises
      an axis aligned with the rotational axis of the turbine wheel,
      a lower lip disposed between the lower axial face of the shroud component and the lower axial face of the turbine housing,
      an upper lip disposed between the upper axial face of the shroud component and the upper axial face of the turbine housing, and
      a wall that extends between the lower lip and the upper lip, the wall disposed between the outer seal surface of the shroud component and the inner seal surface of the turbine housing.

2. The turbine assembly of claim 1 wherein the lower lip of the expansion seal extends radially outwardly from the wall and wherein the upper lip of the expansion seal extends radially inwardly from the wall.

3. The turbine assembly of claim 1 wherein the expansion seal comprises a relaxed state and a tension state.

4. The turbine assembly of claim 3 wherein, for the relaxed state, the lower lip extends outwardly from the wall at an acute angle and wherein, for the tension state, the lower lip extends outwardly at a greater, acute angle to the wall.

5. The turbine assembly of claim 3 wherein, for the relaxed state, the upper lip extends inwardly from the wall at an acute angle and wherein, for the tension state, the upper lip extends inwardly at a greater, acute angle to the wall.

6. The turbine assembly of claim 1 wherein the expansion seal contacts the shroud component and contacts the turbine housing.

7. The turbine assembly of claim 1 wherein the expansion seal is loaded via contacts with the shroud component and the turbine housing.

8. The turbine assembly of claim 7 wherein the lower axial face of the turbine housing and the upper axial face of the shroud component load the expansion seal.

9. The turbine assembly of claim 1 wherein the shroud component comprises a component of a variable geometry cartridge.

10. The turbine assembly of claim 1 wherein the turbine housing defines, at least in part, a volute and wherein the lower axial face of the shroud component extends radially outwardly to the volute.

11. The turbine assembly of claim 1 wherein the turbine housing defines, at least in part, a volute and wherein the lower axial face of the turbine housing extends radially outwardly to the volute.

12. The turbine assembly of claim 1 wherein the lower axial face of the shroud component and the lower axial face of the turbine housing form an annular passage in fluid communication with an exhaust volute and wherein the expansion seal seals an end of the annular passage.

13. The turbine assembly of claim 1 wherein the upper axial face of the shroud component and the upper axial face of the turbine housing form an annular passage in fluid communication with an exhaust outlet at an axial position downstream from the blades of the turbine wheel and wherein the expansion seal seals an end of the annular passage.

14. The turbine assembly of claim 1 wherein an inner perimeter of the upper axial face of the shroud component defines an outlet for exhaust at an axial position downstream the blades of the turbine wheel.

15. The turbine assembly of claim 1 wherein an inner perimeter of the upper axial face of the turbine housing defines an inlet for exhaust at an axial position downstream the blades of the turbine wheel.

16. The turbine assembly of claim 1 wherein, at an axial position along the rotational axis of the turbine wheel, the inner shroud surface of the shroud component comprises a first diameter, the outer seal surface of the shroud component comprises a second diameter, the wall of the expansion seal comprises a third diameter, the inner seal surface of the turbine housing comprises a fourth diameter and wherein the first, second, third and fourth diameters are concentric.

17. A method comprising:
   providing a center housing, a heat shield, a variable geometry cartridge, a flange, a turbine housing and an expansion seal;
   positioning the heat shield on the center housing, positioning the variable geometry cartridge on the heat shield, positioning the flange on the variable geometry cartridge and positioning the expansion seal on the variable geometry cartridge to form an assembly; and
   attaching the turbine housing to the assembly to form a turbocharger and to thereby apply a load to the variable geometry cartridge via the heat shield and the expansion seal.

18. The method of claim 17 further comprising operating the turbocharger and expanding or contracting the expansion seal between the variable geometry cartridge and the turbine housing.

19. The method of claim 18 further comprising maintaining an axial load on the variable geometry cartridge to axially locate the variable geometry cartridge against the flange.

20. A turbocharger assembly comprising:

a compressor wheel disposed in a compressor housing;

a center housing that comprises a bore and a bearing system disposed in the bore, the compressor housing attached to the center housing;

a shaft and turbine wheel assembly that comprises a shaft portion, a turbine wheel portion, and a rotational axis wherein the compressor wheel is attached to the shaft portion and the shaft portion is rotatably supported by the bearing system disposed in the bore of the center housing;

a heat shield positioned on the center housing;

a variable geometry cartridge positioned on the heat shield wherein the variable geometry cartridge comprises a shroud component that comprises an axis aligned with the rotational axis of the turbine wheel, an inner shroud surface, a lower axial face, an upper axial face and an outer seal surface that extends between the lower axial face and the upper axial face;

a flange positioned on the variable geometry cartridge;

a turbine housing attached to the center housing to clamp the flange therebetween wherein the turbine housing comprises an axis aligned with the rotational axis of the turbine wheel, a lower axial face, an upper axial face and an inner seal surface that extends between the lower axial face and the upper axial face; and an expansion seal that comprises
- an axis aligned with the rotational axis of the turbine wheel,
- a lower lip disposed between the lower axial face of the shroud component and the lower axial face of the turbine housing,
- an upper lip disposed between the upper axial face of the shroud component and the upper axial face of the turbine housing, and
- a wall that extends between the lower lip and the upper lip, the wall disposed between the outer seal surface of the shroud component and the inner seal surface of the turbine housing.

* * * * *